Jan. 14, 1941.　　　D. I. PLETCHER　　　2,228,585

THRUST HEAD FOR SYRINGES

Filed March 22, 1939

Delmer I. Pletcher
INVENTOR

BY Henry B. Lister
ATTORNEY

Patented Jan. 14, 1941

2,228,585

UNITED STATES PATENT OFFICE 2,228,585

THRUST HEAD FOR SYRINGES

Delmer I. Pletcher, Bakersfield, Calif.

Application March 22, 1939, Serial No. 263,481

1 Claim. (Cl. 128—215)

This invention relates to a thrust head device, easily removable, for hypodermic syringes and the like and has for its principal object a positive, simple thrust bearing against the cartridge or barrel without springs or rubber to adjust same. In lieu of which a tightening, threaded nut engages the lug, previously positioned by advancing the plunger rod in contact with a ball and socket arrangement. The ball and socket is carried forward by the threaded and grooved nut. The opening in the above indicated nut corresponds to the diameter of a cartridge of standard manufacture and upon withdrawal of the ball and socket carrying thrust head the used cartridge may be readily removed and a new one inserted without removing the nut. The grooved end of the plunger rod permits the encased balls to be disengaged and the thrust head readily removed by a direct pull backward on the plunger rod. Another important feature relative to this thrust head is that it reduces the number of parts entering into the manufacture and hence its lower cost and simplicity in cleaning and sterilizing.

Ease and rapidity in end loading and unloading cartridge with end thrust against needle.

Another very important object of this present invention is that the operator of the syringe has manual control of the action and it may be adjusted to suit any desired pressure or fancy and holds cartridge in place without leakage or blowouts. Other objects and advantages reside in the special construction which gives balance, symmetry and proper fulcrum point under pressure, this also gives the necessary feel while operating, unhampered by spring tension.

Various elements forming the invention are more fully hereinafter described and claimed, reference being had to the accompanying drawing forming part hereof, wherein like numerals refer to like parts and in which:

Figure 3:
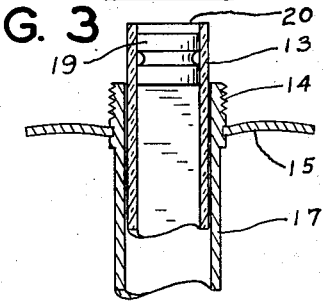

Fig. 3, cross-section of syringe barrel end with protruding cartridge and piston cork—interchangeable handles shown as barrel mounting hereby.

Figure 1:
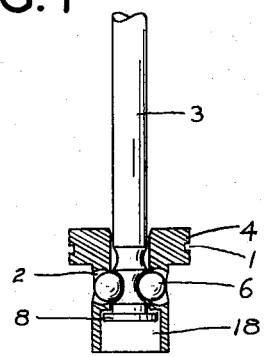
Fig. 1 is a view in cross-section showing a thrust head with ball and socket in release position in plunger rod groove. Also a recess for interchangeable handles.
Figure 2:
Fig. 2 is an adjusting nut and ball gripping recess and flange, in cross-section with cartridge opening.
Figure 4:
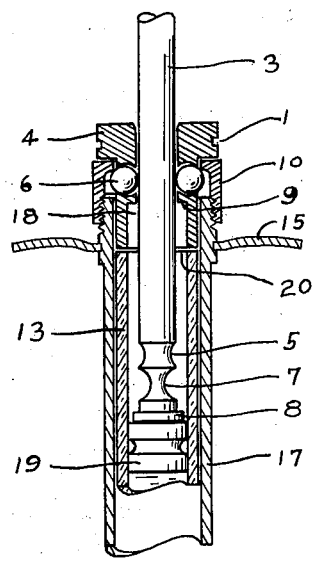

Fig. 4 is a mainly cross-sectioned view of assembled parts shown in Figs. 1-2-3.

In the numerals:

The syringe barrel 17 of an ordinary cartridge hypodermic syringe is equipped with a male thread 14, which screws into a female thread 16 in the adjustment nut 10, in which is opening 11 in the cap, through which cartridge 13 may be inserted to charge, and through which it may be withdrawn when it has been discharged; the thrust head 4 can also be inserted through opening 11 in said nut 10. Thrust head 4 is attached to piston rod 3 in such manner that the piston rod 3 can be freely moved up and down through thrust head 4, which is cylindrical in shape, its inner diameter being only sufficiently larger than the diameter of the piston rod 3 to allow free movement, and the outer diameter of the thrust head 4 is substantially the same as the diameter of the ampule or cartridge; at the lower end of piston rod 3 a flange or piston 8 is attached, which has approximately a slightly smaller diameter than the interior of the glass cartridge, but with a slightly greater diameter than the inside of the thrust head 4. There are sockets or a socket 2, in thrust head 4, which are conical in shape with the wider or base of the cone on the interior and with the exterior less than the diameter of the balls 6, 6, so that the balls 6, 6 cannot fall out. When the balls 6, 6 are forced into the cavity 12 by the piston rod 3, the piston thrust head 4 cannot be drawn through the opening 11. When the piston rod 3 is pulled back so that balls 6, 6 can fall into groove 7, the piston rod 3 and the entire thrust head 4 will pull out through the opening 11, and the old cartridge can be withdrawn through opening 11 and a new cartridge inserted.

Having thus described my invention, what I claim as new is:

In a device of the character described, comprising a barrel of a hypodermic syringe, a flanged nut at the upper end thereof, a circular hole in the said nut of less diameter than the interior diameter of the barrel, a thrust-head slidable in the said hole, a socket in the thrust-head carrying a moveable ball lock, a hole in the center of the thrust head of sufficient diameter to allow a piston rod to slide up and down through it, the diameter of the piston being sufficient to force the ball outwards through the exterior wall of the thrust head to lock said thrust head in the barrel of the syringe, a groove annular in shape at the lower end of the piston rod to allow the ball to contract through the inner wall of the thrust head to unlock it.

DELMER I. PLETCHER.